(12) United States Patent
Kato

(10) Patent No.: US 8,740,093 B2
(45) Date of Patent: Jun. 3, 2014

(54) RADIO IC DEVICE AND RADIO COMMUNICATION TERMINAL

(71) Applicant: Murata Manufacturing Co., Ltd., Nagaokakyo (JP)

(72) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/017,406

(22) Filed: Sep. 4, 2013

(65) Prior Publication Data

US 2014/0001274 A1  Jan. 2, 2014

Related U.S. Application Data

(63) Continuation of application No. PCT/JP2012/059350, filed on Apr. 5, 2012.

(30) Foreign Application Priority Data

Apr. 13, 2011 (JP) ................................ 2011-089496

(51) Int. Cl.
*G06K 19/06* (2006.01)
(52) U.S. Cl.
USPC .......................................... 235/492; 235/487
(58) Field of Classification Search
USPC .................................................. 235/487, 492
See application file for complete search history.

(56) References Cited

U.S. PATENT DOCUMENTS

| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |

(Continued)

FOREIGN PATENT DOCUMENTS

| CA | 2 279 176 A1 | 7/1998 |
| DE | 10 2006 057 369 A1 | 6/2008 |

(Continued)

OTHER PUBLICATIONS

Official Communication issued in International Patent Application No. PCT/JP2009/056934, mailed on Jun. 30, 2009.

(Continued)

*Primary Examiner* — Paultep Savusdiphol
(74) *Attorney, Agent, or Firm* — Keating & Bennett, LLP

(57) ABSTRACT

A radio IC device includes a radio IC element arranged to process a high-frequency signal, a substrate on which the radio IC element is mounted, a planar conductor arranged on a first surface of the substrate, and a first wiring electrode and a second wiring electrode including respective first ends connected to a pair of input/output electrodes of the radio IC element. The first wiring electrode and the second wiring electrode are arranged on a second surface of the substrate, the second surface being parallel or substantially parallel to the first surface and including respective second ends electrically connected to the planar conductor, and defining loops when looking at the substrate from X-, Y- and Z-directions orthogonal to one another.

20 Claims, 16 Drawing Sheets

(56) References Cited

U.S. PATENT DOCUMENTS

| | | |
|---|---|---|
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |
| 6,181,287 B1* | 1/2001 | Beigel ............ 343/741 |
| 6,190,942 B1 | 2/2001 | Wilm et al. |
| 6,243,045 B1* | 6/2001 | Ishibashi ............ 343/741 |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1* | 9/2002 | Porte ............ 343/866 |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,956,481 B1 | 10/2005 | Cole |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,198,193 B2* | 4/2007 | Hassan-Zade et al. ........ 235/385 |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2001/0011012 A1 | 8/2001 | Hino et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2002/0186004 A1 | 12/2002 | Prazeres da Costa et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2003/0206095 A1 | 11/2003 | Chaloner et al. |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0001031 A1 | 1/2005 | Akiho et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0133605 A1 | 6/2005 | Koyama et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0242959 A1* | 11/2005 | Watanabe ............ 340/572.7 |
| 2005/0253726 A1 | 11/2005 | Yoshida et al. |
| 2005/0275539 A1 | 12/2005 | Sakama et al. |
| 2006/0001138 A1* | 1/2006 | Sakama et al. ............ 257/678 |
| 2006/0032926 A1* | 2/2006 | Baba et al. ............ 235/492 |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0114159 A1 | 6/2006 | Yoshikawa et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0208900 A1 | 9/2006 | Tavassoli Hozouri |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0015549 A1 | 1/2007 | Hernandez et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0182561 A1* | 8/2007 | Hassan-Zade et al. ..... 340/572.7 |
| 2007/0200705 A1 | 8/2007 | Yamagajo et al. |
| 2007/0200782 A1 | 8/2007 | Hayama et al. |
| 2007/0218953 A1* | 9/2007 | Shtrom et al. ............ 455/562.1 |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0252770 A1 | 11/2007 | Kai et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0074268 A1 | 3/2008 | Shafer |
| 2008/0087990 A1 | 4/2008 | Kato et al. |
| 2008/0111695 A1 | 5/2008 | Yamagajo et al. |
| 2008/0129606 A1 | 6/2008 | Yanagisawa et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0272885 A1 | 11/2008 | Atherton |
| 2009/0002130 A1 | 1/2009 | Kato |
| 2009/0008460 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0066466 A1 | 3/2009 | Arimura |
| 2009/0080296 A1 | 3/2009 | Dokai et al. |
| 2009/0096696 A1 | 4/2009 | Joyce, Jr. et al. |
| 2009/0102729 A1* | 4/2009 | Wang et al. ............ 343/702 |
| 2009/0109034 A1 | 4/2009 | Chen et al. |
| 2009/0109102 A1 | 4/2009 | Dokai et al. |
| 2009/0134979 A1 | 5/2009 | Tsukamoto et al. |
| 2009/0140947 A1 | 6/2009 | Sasagawa et al. |
| 2009/0160719 A1 | 6/2009 | Kato et al. |
| 2009/0179742 A1* | 7/2009 | Takeshima et al. .......... 340/10.1 |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |
| 2009/0321527 A1 | 12/2009 | Kato et al. |
| 2010/0103058 A1 | 4/2010 | Kato et al. |

(56) References Cited

U.S. PATENT DOCUMENTS

| | | |
|---|---|---|
| 2010/0182210 A1 | 7/2010 | Ryou et al. |
| 2010/0283694 A1 | 11/2010 | Kato |
| 2010/0308118 A1 | 12/2010 | Kataya et al. |
| 2011/0031320 A1 | 2/2011 | Kato et al. |
| 2011/0063184 A1 | 3/2011 | Furumura et al. |
| 2011/0080331 A1 | 4/2011 | Kato |
| 2011/0186641 A1 | 8/2011 | Kato et al. |
| 2011/0253795 A1 | 10/2011 | Kato |
| 2012/0001701 A1 | 1/2012 | Taniguchi et al. |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| GB | 2 305 075 A | 3/1997 |
| GB | 2461443 A | 1/2010 |
| GB | 2470299 A | 11/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-88586 A | 4/1996 |
| JP | 08-088586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-093029 A | 4/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 09-294374 A | 11/1997 |
| JP | 9-512367 A | 12/1997 |
| JP | 10-69533 A | 3/1998 |
| JP | 10-069533 A | 3/1998 |
| JP | 10-084406 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-048152 A | 2/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |

(56) References Cited

FOREIGN PATENT DOCUMENTS

| | | |
|---|---|---|
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-325013 A | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-139866 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-506905 A | 3/2004 |
| JP | 2004-104344 A | 4/2004 |
| JP | 2004-121412 A | 4/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166176 A | 6/2004 |
| JP | 2004-213582 A | 7/2004 |
| JP | 2004-519916 A | 7/2004 |
| JP | 2004/070879 A | 8/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |

(56) References Cited

FOREIGN PATENT DOCUMENTS

| | | |
|---|---|---|
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-202943 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-328259 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-013120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |
| JP | 2007-266999 A | 10/2007 |
| JP | 2007-272264 A | 10/2007 |
| JP | 2007-279782 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |
| JP | 2008-226099 A | 9/2008 |
| JP | 2008-252517 A | 10/2008 |
| JP | 2008-288915 A | 11/2008 |

(56) References Cited

FOREIGN PATENT DOCUMENTS

| | | |
|---|---|---|
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111986 A | 5/2009 |
| JP | 2009-130896 A | 6/2009 |
| JP | 2009-135166 A | 6/2009 |
| JP | 2009-524363 A | 6/2009 |
| JP | 2009-153166 A | 7/2009 |
| JP | 4301346 B2 | 7/2009 |
| JP | 2009-181246 A | 8/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-284182 A | 12/2009 |
| JP | 2010-009196 A | 1/2010 |
| JP | 2010-015342 A | 1/2010 |
| JP | 2010-504598 A | 2/2010 |
| JP | 2010-050844 A | 3/2010 |
| JP | 2010-051012 A | 3/2010 |
| JP | 2010-051017 A | 3/2010 |
| JP | 2010-074839 A | 4/2010 |
| JP | 2010-081571 | 4/2010 |
| JP | 4535209 B2 | 9/2010 |
| JP | 4561932 B2 | 10/2010 |
| JP | 2010-268306 A | 11/2010 |
| JP | 2011-015395 A | 1/2011 |
| JP | 4609604 B2 | 1/2011 |
| JP | 2011-076567 A | 4/2011 |
| JP | 2011-205384 A | 10/2011 |
| JP | 2012-033021 A | 2/2012 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/013168 A1 | 2/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/099602 A1 | 9/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/001561 A1 | 1/2008 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/005080 A1 | 1/2009 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |
| WO | 2010/104179 A1 | 9/2010 |
| WO | 2010/119854 A1 | 10/2010 |
| WO | 2011/062274 A1 | 5/2011 |

OTHER PUBLICATIONS

Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781; filed Aprl. 6, 2011.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.

(56) References Cited

OTHER PUBLICATIONS

Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.
Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Dokai et al.: "Wireless Communication Device"; U.S. Appl. No. 13/782,346, filed Mar. 1, 2013.
Official Communication issued in International Patent Application No. PCT/JP2012/053344, mailed on May 22, 2012.
Official communication issued in counterpart International Application No. PCT/JP2008/071502, mailed Feb. 24, 2009.
Kato et al.: "Wireless IC Device and Manufacturing Method Thereof,"; U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/055567, mailed May 20, 2008.
Ikemoto et al.: "Wireless IC Device and Electronic Apparatus," U.S. Appl. No. 12/503,188, filed July. 15, 2009.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Application No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device", U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC device", U.S. Appl. No. 13/163,803; filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429; filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.

(56) References Cited

OTHER PUBLICATIONS

Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device", U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Application No. PCT/JP2010/056812, mailed on Jul. 13, 2010.
Dokai et al.: "Optical Disc"; U.S. Appl. No. 13/295,153; filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575; filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.

(56) References Cited

OTHER PUBLICATIONS

Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2012/050557, mailed Apr. 10, 2012.
Kimura et al.: "Wireless Communication Device"; U.S. Appl. No. 13/789,761, filed Mar. 8, 2013.
Dokai et al.: "RFID Chip Package and RFID TAG"; U.S. Appl. No. 13/792,650, filed Mar. 11, 2013.
Kato et al.: "Wireless IC Device Component and Wireless IC Device"; U.S. Appl. No. 13/794,929, filed Mar. 12, 2013.
Kato et al.: "Wireless IC Device and Component for Wireless IC Device"; U.S. Appl. 13/848,748, filed Mar. 22, 2013.
Official Communication issued in International Patent Application No. PCT/JP2012/080493, mailed on Dec. 25, 2012.
Mukai et al.: "Inspection Method and Inspection Device for RFID Tag"; U.S. Appl. No. 13/933,184, filed Jul. 2, 2013.
Kato et al.: "Antenna Device and Method of Setting Resonant Frequency of Antenna Device"; U.S. Appl. No. 13/941,760, filed Jul. 15, 2013.
Kato et al.: "Antenna Device and Method of Setting Resonant Frequency of Antenna Device"; U.S. Appl. No. 13/943,973, filed Jul. 17, 2013.
Official Communication issued in International Patent Application No. PCT/JP2012/080700, mailed on Jan. 15, 2013.
Mukai et al.: "Wireless Integrated Circuit Device and Method of Manufacturing the Same"; U.S. Appl. No. 13/961,995, filed Aug. 8, 2013.
Kato et al.: "Radio IC Device"; U.S. Appl. No. 13/964,234, filed Aug. 12, 2013.
Official Communication issued in International Patent Application No. PCT/JP2012/067779, mailed on Aug. 28, 2012.
Official Communication issued in International Patent Application No. PCT/JP2013/051254, mailed on Apr. 2, 2013.
Dokai: "Wireless Communication Device"; U.S. Appl. No. 13/970,633, filed Aug. 20, 2013.
Official Communication issued in International Patent Application No. PCT/JP20121059350, mailed on Jul. 3, 2012.
Dokai: "Wireless IC Device"; U.S. Appl. No. 14/011,823, filed Aug. 28, 2013.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399; filed Mar. 5, 2008.
Official communication issued in related U.S. Appl. No. 12/042,399; mailed on Aug. 25, 2008.

* cited by examiner

F I G . 4
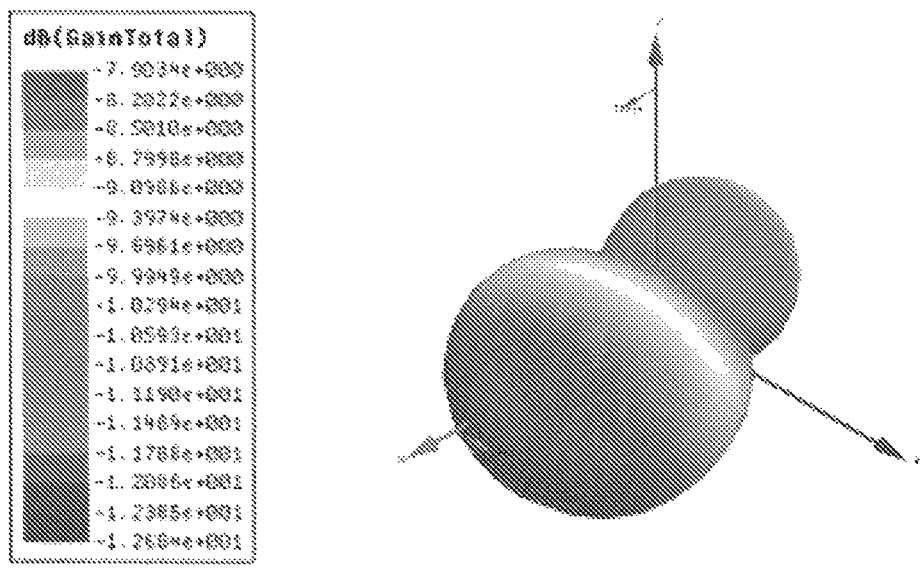

F I G . 1 1
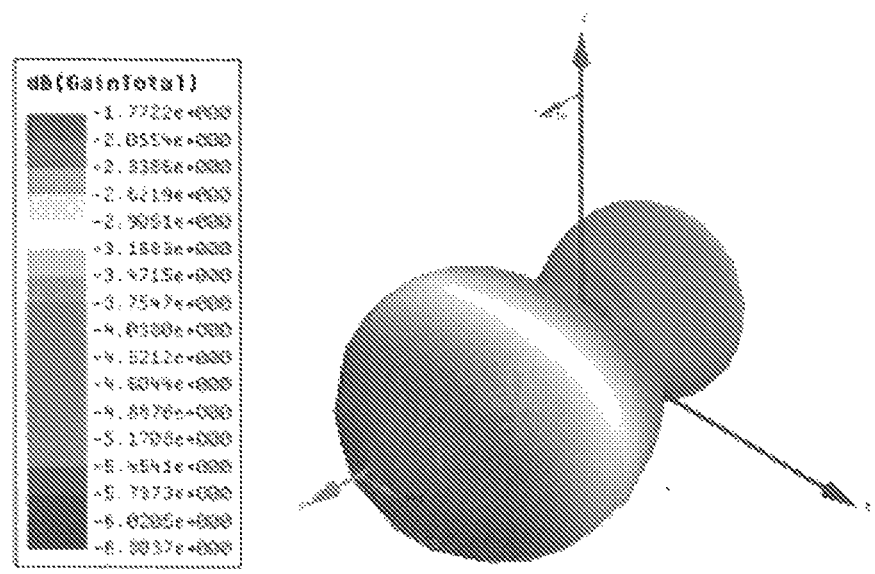

F I G. 1 4
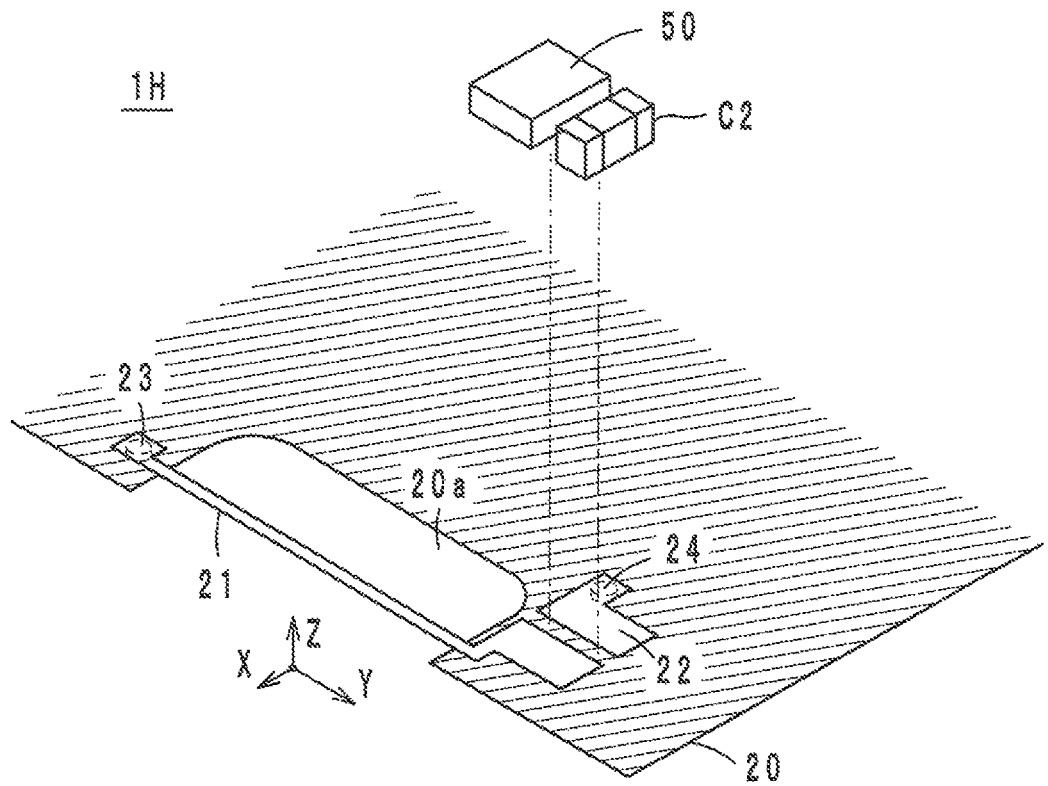
F I G. 1 5
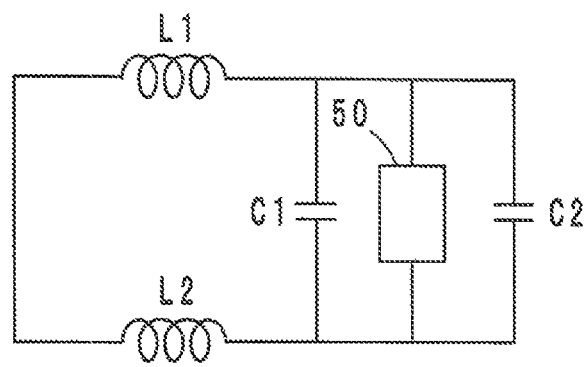

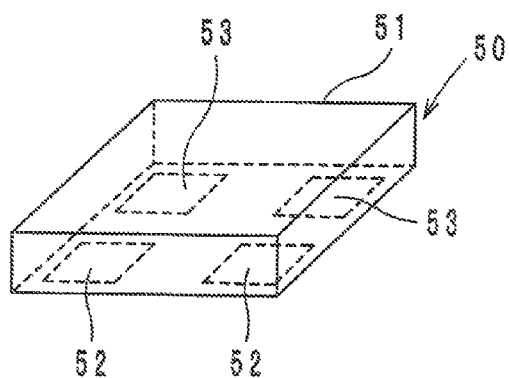
F I G . 17
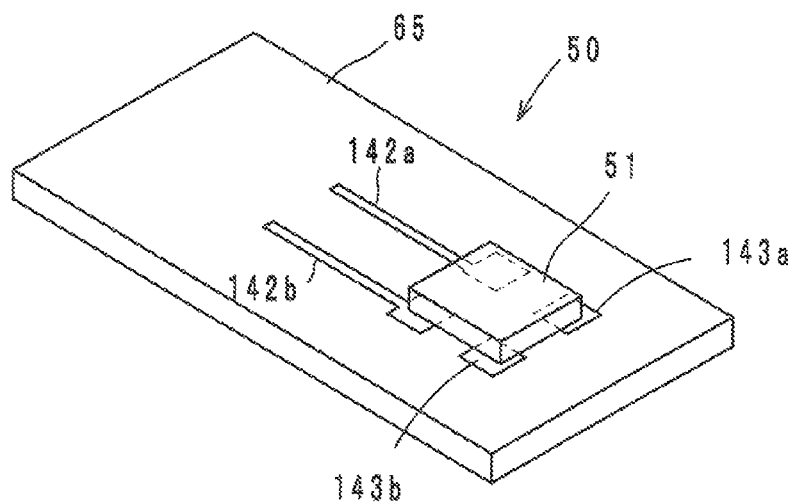
F I G . 18
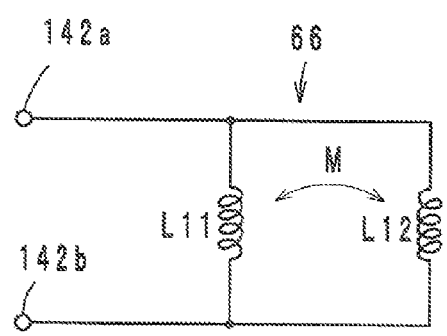
F I G . 19

F I G . 2 0
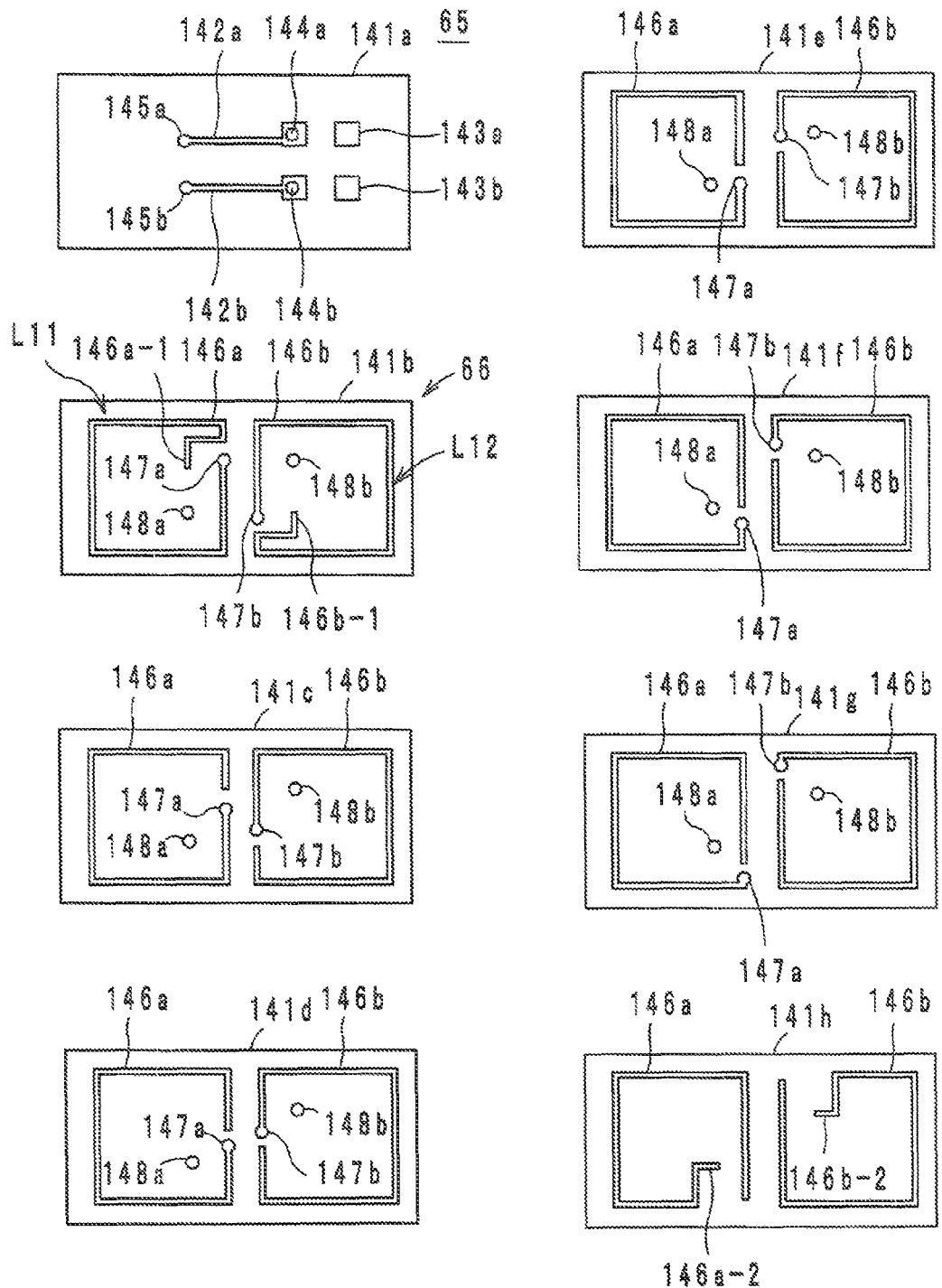

RADIO IC DEVICE AND RADIO COMMUNICATION TERMINAL

BACKGROUND OF THE INVENTION

1. Field of the Invention

The present invention relates to a radio IC device and more particularly to a radio IC device for use in an RFID (Radio Frequency Identification) system. The present invention further relates to a radio communication terminal including a radio IC device.

2. Description of the Related Art

As an information management system for articles, an RFID system has recently been practiced which transfers predetermined information through communication in a non-contact manner by utilizing an electromagnetic field between a reader/writer generating an induction magnetic field and an RFID tag (also called a "radio IC device") attached to an article. The RFID tag includes a radio IC element for storing predetermined information and processing a predetermined radio signal, and an antenna (a "radiator") for transmitting and receiving a high-frequency signal. The RFID tag is used in a state attached to each of various articles (or packaging materials thereof) that are targets of management.

International Publications WO2009/011154 and WO2009/005080 disclose a radio IC device (RFID tag) in which radiation patterns each having a loop shape, when viewed from one direction, are coupled with a radio IC element. The radiation patterns couple a conductor, which functions as an antenna, with the radio IC element, whereby a dedicated antenna is not required and impedance matching is facilitated. However, because the radiation patterns have the loop shape only when viewed from one direction, a problem arises in that radiation directionality is changed depending on directions. Thus, the directionality lowers in the direction in which the radiation patterns appear in the loop shape.

SUMMARY OF THE INVENTION

Preferred embodiments of the present invention provide a radio IC device and a radio communication terminal, with which good radiation directionality can be obtained in any of three directions of a substrate.

According to a first preferred embodiment of the present invention, a radio IC device includes a radio IC element arranged to process a high-frequency signal, a substrate on which the radio IC element is mounted, a planar conductor arranged on a first surface of the substrate, and a first wiring electrode and a second wiring electrode including respective first ends connected to a pair of input/output electrodes of the radio IC element, wherein the first wiring electrode and the second wiring electrode are arranged on a second surface of the substrate, the second surface being parallel or substantially parallel to the first surface, and respective second ends electrically connected to the planar conductor, and wherein the first wiring electrode and the second wiring electrode define loops when looking at the substrate from X-, Y- and Z-directions orthogonal to one another.

According to a second preferred embodiment of the present invention, a radio communication terminal includes the above-described radio IC device.

In the above-described radio IC device, since the first wiring electrode and the second wiring electrode define loops when looking at the substrate from the X-, Y- and Z-directions orthogonal to one another, the wiring electrodes define planes in each of which a loop is not defined when viewed from any of the X-, Y- and Z-directions. A magnetic field propagating parallel or substantially parallel to the surface of the planar conductor passes through the loops defined by the first and second wiring electrodes. Accordingly, a coupling degree between the first and second wiring electrodes and the planar conductor is increased, and good radiation directionality can be obtained in each of the three directions of the substrate.

Thus, with the preferred embodiments of the present invention, good radiation directionality can be obtained in any of the three directions of the substrate.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a plan view, FIG. 2B is an enlarged sectional view taken along a line IIB-IIB in FIG. 2A, and FIG. 2C is a sectional view taken along a line IIC-IIC in FIG. 2A.

FIG. 4 is an illustration representing radiation directionality of the radio IC device according to the first preferred embodiment of the present invention.

FIG. 11 is an illustration representing radiation directionality of the radio IC device according to the fifth preferred embodiment of the present invention.

FIG. 14 is a perspective view of a radio IC device according to an eighth preferred embodiment of the present invention.

FIG. 15 is an equivalent circuit diagram of the radio IC device according to the eighth preferred embodiment of the present invention.

FIG. 16A is a plan view, and FIG. 16B is a front view.

FIG. 17 is a perspective view of a radio IC chip serving as a radio IC element according to a preferred embodiment of the present invention.

FIG. 18 is a perspective view illustrating a state where the radio IC chip is mounted, as the radio IC element, on a feeder circuit board according to a preferred embodiment of the present invention.

FIG. 19 is an equivalent circuit diagram illustrating one example of a feeder circuit according to a preferred embodiment of the present invention.

FIG. 20 illustrates a layered structure of the feeder circuit board according to a preferred embodiment of the present invention in plan views.

DETAILED DESCRIPTION OF THE PREFERRED EMBODIMENTS

Figure 1:
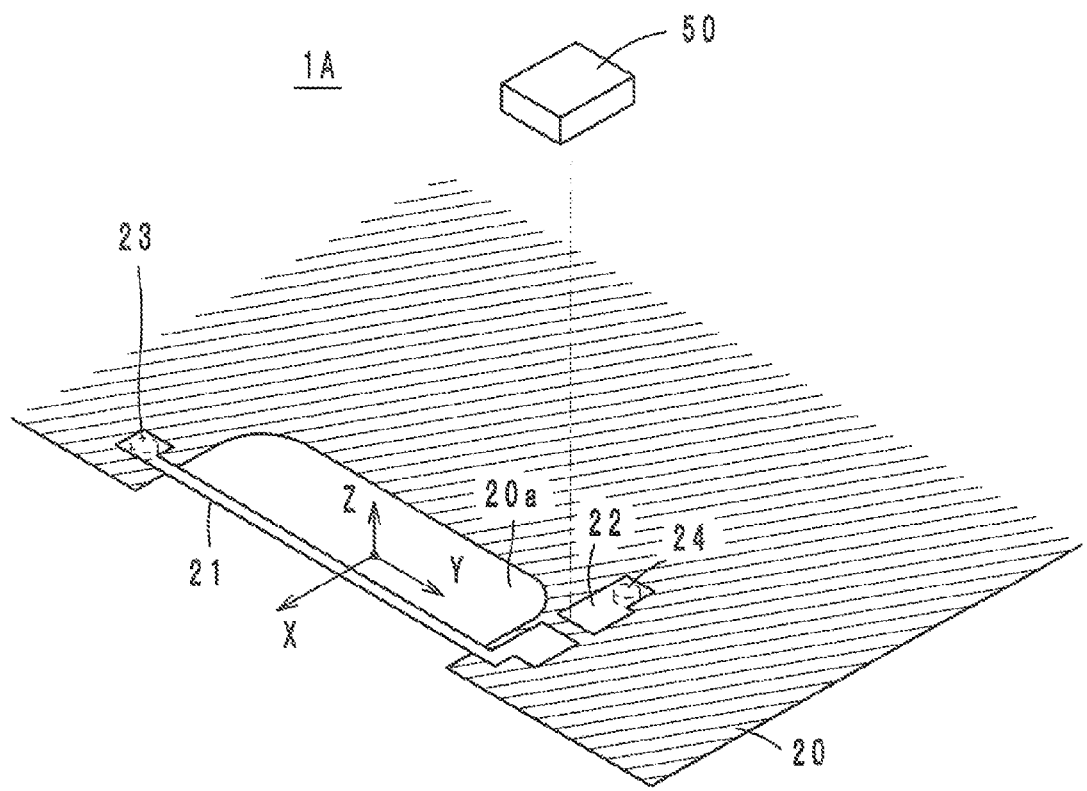
FIG. 1 is a perspective view of a radio IC device according to a first preferred embodiment of the present invention.
Figure 2A:
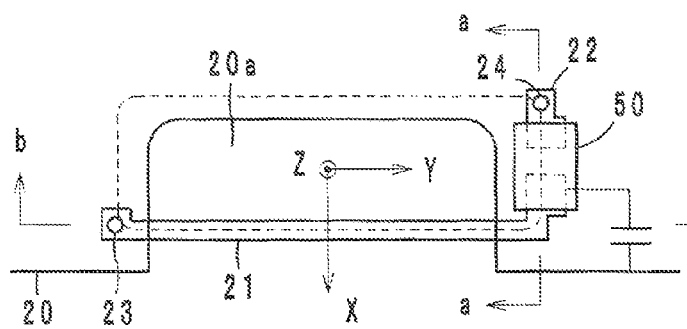
FIGS. 2A, 2B, and 2C illustrate principal portion of the radio IC device according to the first preferred embodiment of the present invention; specifically.
Figure 2B:
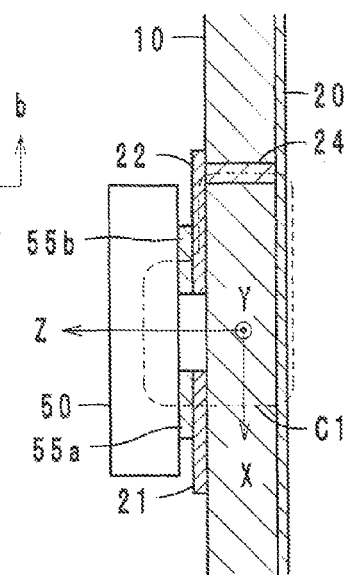
Figure 2C:
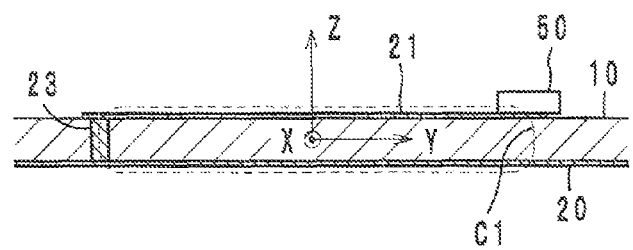

Preferred embodiments of the radio IC device and the radio communication terminal according to the present invention will be described below with reference to the accompanying drawings. It is to be noted that common components and portions in the drawings are denoted by the same signs and duplicate description thereof is omitted.

First Preferred Embodiment

A radio IC device 1A according to a first preferred embodiment of the present invention is preferably used in an RFID system of a UHF band, for example. As illustrated in FIGS. 1 and 2A to 2C, the radio IC device 1A preferably includes a radio IC element 50 arranged to process a high-frequency signal, a printed circuit board 10 to which the radio IC element 50 is mounted, a planar conductor 20 arranged on a lower surface of the printed circuit board 10, and a first wiring electrode 21 and a second wiring electrode 22 that are electrically connected, at their one ends (land portions), to a pair of input/output terminal electrodes of the radio IC element 50 through solder bumps. The first and second wiring electrodes 21 and 22 are arranged on an upper surface of the printed circuit board 10.

The printed circuit board 10 is incorporated in a casing of, e.g., a cellular phone, etc. Various circuit elements (not illustrated) constituting, e.g., a communication control circuit, a liquid crystal driving circuit, a power supply circuit, etc. are mounted on the printed circuit board 10. The planar conductor 20 is preferably arranged over the entire or substantially over the entire lower surface of the printed circuit board 10, and the planar conductor 20 functions not only as a radiation conductor (i.e., and antenna) of the radio IC device 1A, but also a ground conductor of the circuit board 10, as described later. The first and second wiring electrodes 21 and 22 are preferably arranged on the upper surface of the circuit board 10. One end of the first wiring electrode 21 is connected to one connecting pad portion used to mount the radio IC element 50, and the other end of the first wiring electrode 21 is electrically connected to the planar conductor 20 through a via hole conductor 23 that is arranged in the circuit board 10. One end of the second wiring electrode 22 is connected to the other connecting pad portion used in mounting the radio IC element 50, and the other end of the second wiring electrode 22 is electrically connected to the planar conductor 20 through a via hole conductor 24 that is arranged in the circuit board 10. In addition, a portion of the planar conductor 20, positioned opposite to the first wiring electrode 21, is preferably cut out in a recessed shape (the portion being hereinafter referred to as a "cutout 20a"). It is to be noted that the via hole conductor 24 is preferably disposed at a position not overlapping with the via hole conductor 23 when viewed from a direction (Y-direction) in which a main portion of the first wiring electrode 21 extends.

In the arrangement described above, the first wiring electrode 21 and the second wiring electrode 22 are arranged in a loop shape when viewed from each of the X-, Y- and Z-directions of the circuit board 10, which are preferably orthogonal or substantially orthogonal to one another. More specifically, as denoted by a dotted line in FIG. 2A, a current path having a loop shape when viewed from the Z-direction is defined by the first wiring electrode 21, the via hole conductor 23, an inner peripheral edge of the cutout 20a in the planar conductor 20, the via hole conductor 24, and the second wiring electrode 22. As denoted by a dotted line in FIG. 2B, when looking at the above-mentioned current path from the Y-direction, a current path having a loop shape is also defined by the first wiring electrode 21, the via hole conductor 23, the inner peripheral edge of the cutout 20a in the planar conductor 20, the via hole conductor 24, and the second wiring electrode 22. As denoted by a dotted line in FIG. 2C, when looking at the above-mentioned current path from the X-direction, a current path having a loop shape is preferably further defined by the first wiring electrode 21, the via hole conductor 23, the inner peripheral edge of the cutout 20a in the planar conductor 20, the via hole conductor 24, and the second wiring electrode 22. Additionally, the above-mentioned current path may be defined by a capacitance C1 that is provided between the planar conductor 20 and the connecting pad portion of the first wiring electrode 21 at which the first wiring electrode 21 is connected to the radio IC element 50.

In this specification, a direction parallel or substantially parallel to a plane direction of the planar conductor 20 is defined as the X-direction, a direction orthogonal or substantially orthogonal to the X-direction along the plane direction of the planar conductor 20 is defined as the Y-direction, and a direction normal or substantially normal to the planar conductor 20 is defined as the Z-direction. More specifically, a direction in which opposite end surfaces of a radio communication terminal 2 are spaced from each other is defined as the X-direction, and a direction in which opposite side surfaces of the radio communication terminal 2 are spaced from each other is defined as the Y-direction (see FIG. 16).

Figure 3:
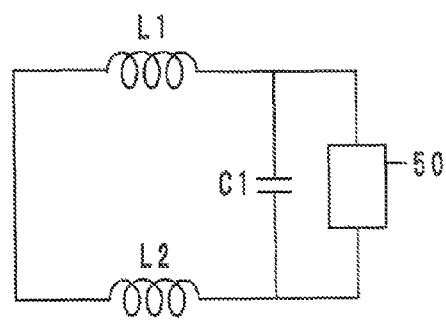
FIG. 3 is an equivalent circuit diagram of the radio IC device according to the first preferred embodiment of the present invention.

The radio IC device 1A according to the first preferred embodiment has an equivalent circuit illustrated in FIG. 3. More specifically, a parallel resonance circuit resonating at a predetermined frequency is defined by an inductance L1 of the first wiring electrode 21, an inductance L2 of the planar conductor 20, and the above-mentioned capacitance C1, the inductances L1 and L2 being connected in series to the input/output terminal electrodes of the radio IC element 50.

The first and second wiring electrodes 21 and 22 are coupled with the planar conductor 20 through the current path having the loop shape in the three directions. Thus, a high-frequency signal radiated from an antenna of a reader/writer of the RFID system and received by the planar conductor 20 is supplied to the radio IC element 50 through the first and second wiring electrodes 21 and 22, such that the radio IC element 50 is operated. On the other hand, a response signal from the radio IC element 50 is forwarded to the planar conductor 20 through the first and second wiring electrodes 21 and 22, and is radiated to the reader/writer.

The first and second wiring electrodes 21 and 22 couple the radio IC element 50 and the planar conductor 20 with each other, so as to function as an impedance matching circuit. Impedance matching can be performed by adjusting respective sizes, e.g., electrical lengths and line widths, of the first and second wiring electrodes 21 and 22.

In the radio IC device 1A according to the first preferred embodiment, since the current path including the first and second wiring electrodes 21 and 22 defines loops when looking at the printed circuit board 10 from the X-, Y- and Z-directions orthogonal to one another, the current path defines planes in each of which a loop is not defined when viewed from any of the X-, Y- and Z-directions. Therefore, a coupling degree between the first and second wiring electrodes 21 and 22 and the planar conductor 20 is increased, and good radiation directionality can be obtained in each of the three directions (X-, Y- and Z-directions) of the printed circuit board 10.

As a result of performing a simulation in the first preferred embodiment on condition of the following design values, coaxial or substantially coaxial radiation directionality was obtained with respect to an X-axis, as illustrated in FIG. 4. A width size (taken in the direction of the X-axis) of the above-mentioned recess was 11 mm, a depth size (taken in the direction of a Y-axis) of the recess was 5 mm, and a gap between the electrodes 21 and 22 was 250 μm, for example. A material of the printed circuit board 10 was a glass epoxy resin, a thickness thereof was 1 mm, ∈r was 4.4, and tan δ (dielectric loss tangent) was 0.02. A maximum gain was −7.9 dBi at a distal end in the positive direction of the X-axis, and a minimum gain was −12.7 dBi at a zero point of the X-axis. Furthermore, a gain was increased on the negative side of the X-axis. A difference between the maximum value and the minimum value was as small as 4.8 dBi, and good directionality was obtained in each of the three directions (X-, Y- and Z-directions) of the printed circuit board 10. In addition, a reactance value was 110Ω.

A larger gain is obtained by setting the size of the planar conductor 20 to a larger value, and the maximum gain and the directionality are changed depending on the depth and width sizes of the cutout 20a. Moreover, a phase characteristic can be changed with a value of the capacitance C1, and a phase can be set differently by adjusting the capacitance C1 even with the cutout 20a having the same shape. The radio IC element 50 is not always needed to be arranged adjacent to the cutout 20a.

Second Preferred Embodiment

Figure 5:
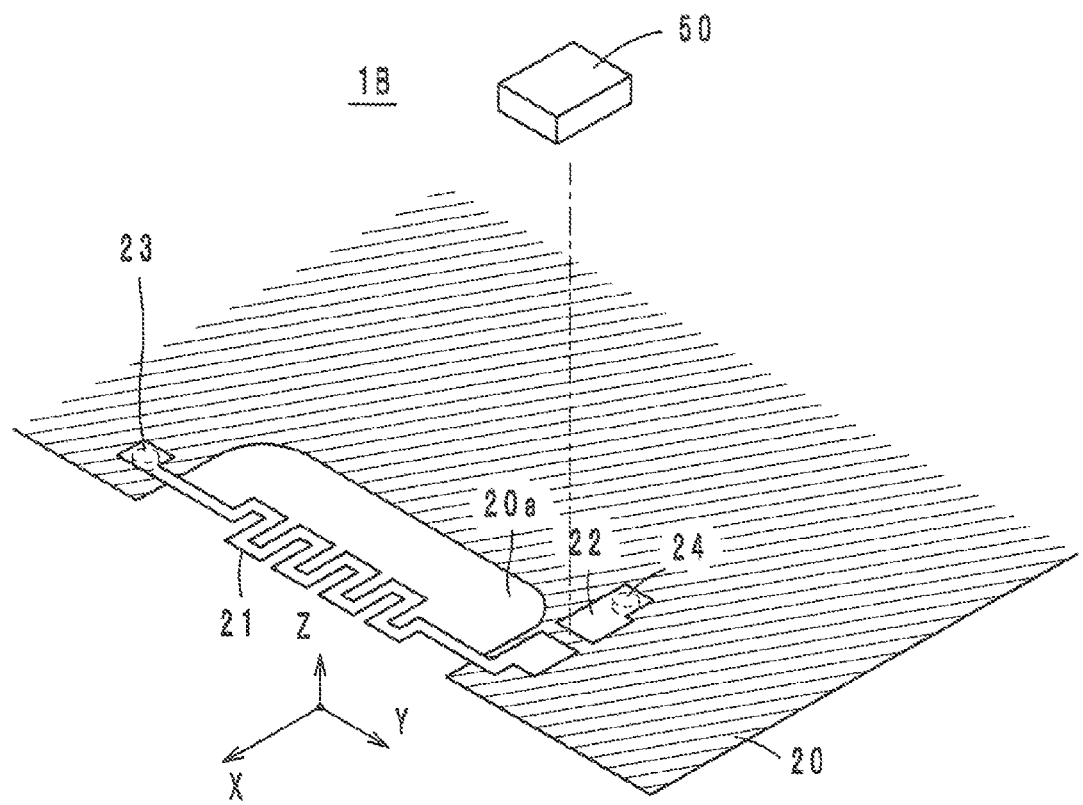
FIG. 5 is a perspective view of a radio IC device according to a second preferred embodiment of the present invention.

In a radio IC device 1B according to a second preferred embodiment of the present invention, as illustrated in FIG. 5, the first wiring electrode 21 preferably has a meandering shape (e.g., a serpentine or zigzag shape), and the remaining structure of the radio IC device 1B is preferably the same or substantially the same as that in the first preferred embodiment of the present invention. Advantageous effects of the second preferred embodiment of the present invention are basically similar to those in the first preferred embodiment. In the second preferred embodiment, particularly, an adjustment range of the inductance L1 can be increased because the first wiring electrode 21 has a meandering shape. Moreover, the directionality is improved particularly in the X-direction, denoted in FIG. 5, looking from the cutout 20a from which a magnetic field is mainly radiated. For that reason, the radio IC element 50 is arranged to be not overlapped with the cutout 20a in a plan view (i.e., when viewed from the Z-direction in FIG. 5). In other words, the radio IC element 50 is preferably arranged outside the cutout 20a.

Third Preferred Embodiment

Figure 6:
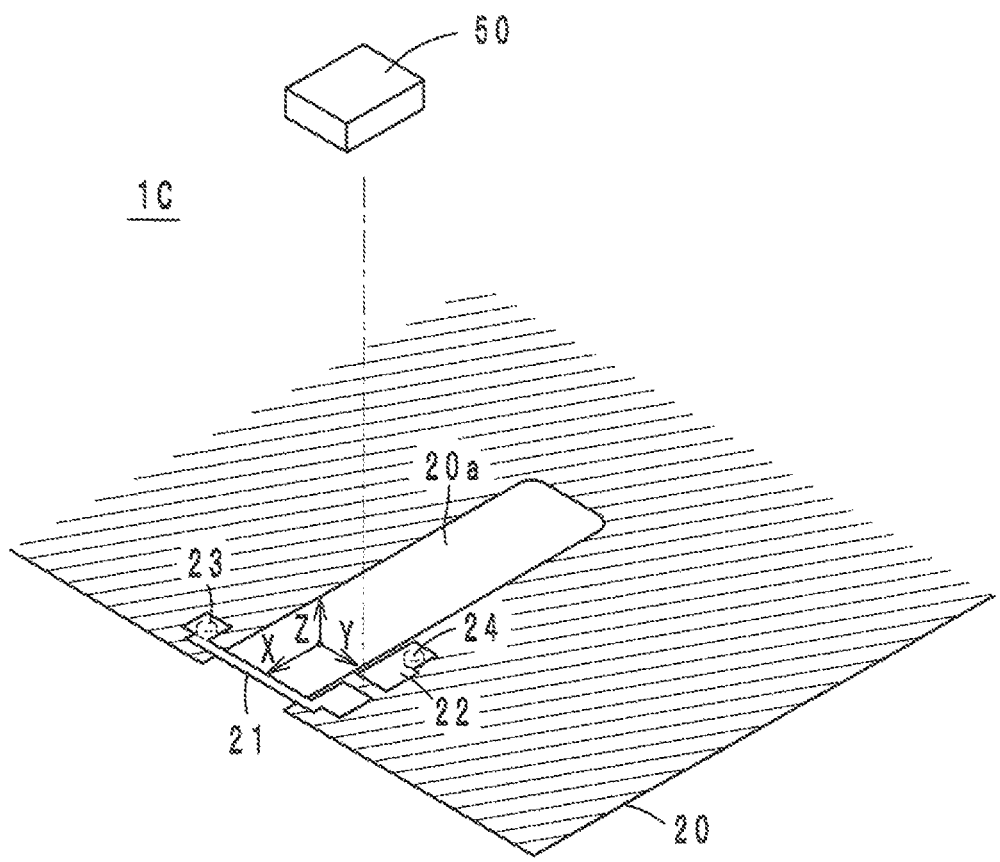
FIG. 6 is a perspective view of a radio IC device according to a third preferred embodiment of the present invention.
Figure 7:
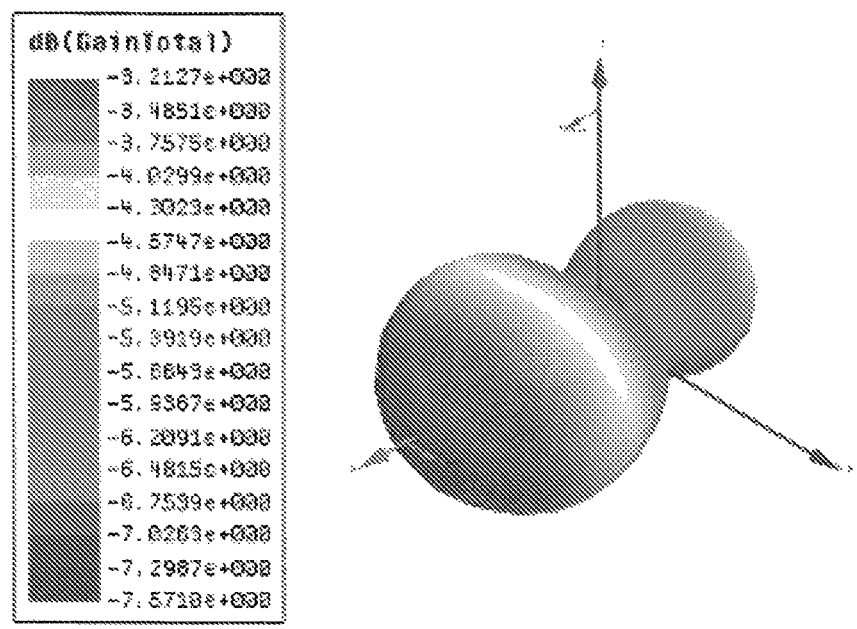
FIG. 7 is an illustration representing radiation directionality of the radio IC device according to the third preferred embodiment of the present invention.

In a radio IC device 1C according to a third preferred embodiment of the present invention, as illustrated in FIG. 6, the cutout 20a arranged in the planar conductor 20 has a narrower width in the Y-axis direction than that in the first preferred embodiment of the present invention, and has a longer size in the X-axis direction than that in the first preferred embodiment. The remaining structure is preferably the same or almost the same as that in the first preferred embodiment of the present invention. Advantageous effects of the third preferred embodiment are basically similar to those in the first preferred embodiment. As a result of performing a simulation on condition of the following design values, coaxial or substantially coaxial radiation directionality was obtained with respect to the X-axis, as illustrated in FIG. 7. A width size (taken in the X-axis direction) of the above-mentioned recess was 3.5 mm, a depth size (taken in the Y-axis direction) of the recess was 15 mm, and a gap between the electrodes 21 and 22 was 250 μm, for example. A material of the printed circuit board 10 was a glass epoxy resin, a thickness thereof was 1 mm, ∈r was 4.4, and tan δ (dielectric loss tangent) was 0.02. A maximum gain was −3.2 dBi at a distal end in the positive direction of the X-axis, and a minimum gain was −7.5 dBi at a zero point of the X-axis. Furthermore, a gain was increased on the negative side of the X-axis. A difference between the maximum value and the minimum value was as small as 4.3 dBi, and good directionality was obtained in each of the three directions (X-, Y- and Z-directions) of the printed circuit board 10. In addition, a reactance value was 110Ω. As seen from comparing the first preferred embodiment of the present invention (see FIG. 4) and the third preferred embodiment of the present invention (see FIG. 7), the maximum gain and the directionality are changed by modifying the shape of the cutout 20a, particularly, the depth size of the cutout 20a.

Fourth Preferred Embodiment

Figure 8:
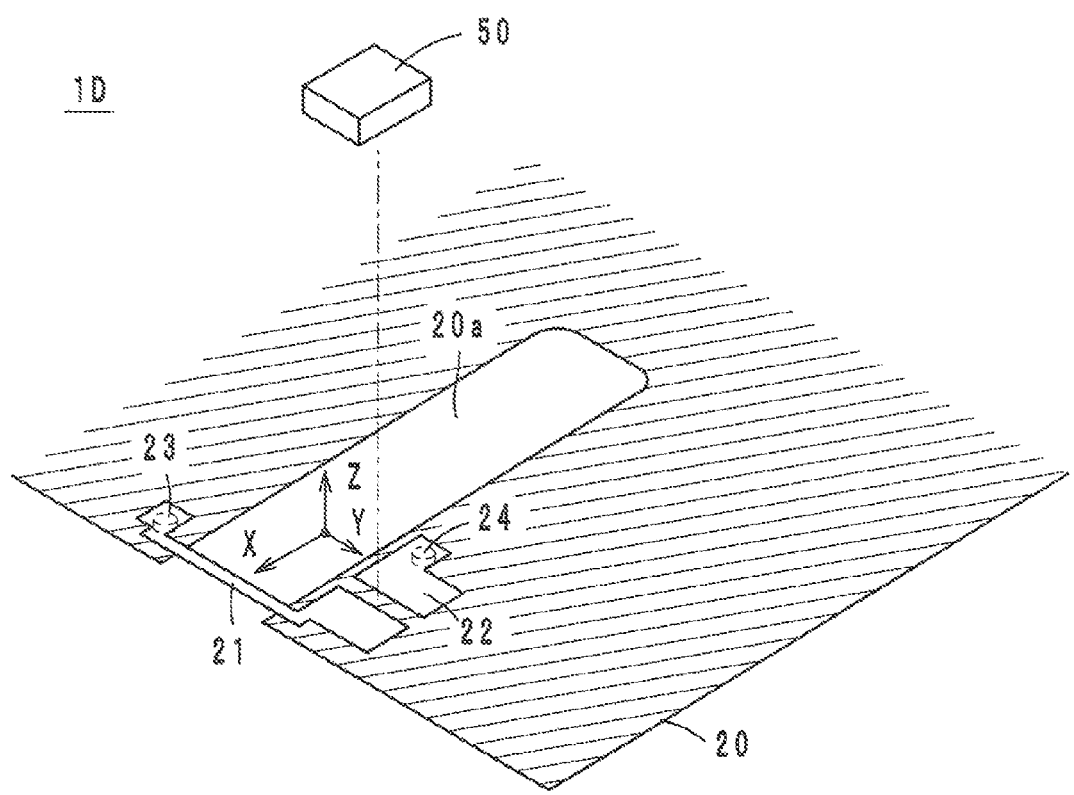
FIG. 8 is a perspective view of a radio IC device according to a fourth preferred embodiment of the present invention.
Figure 9:
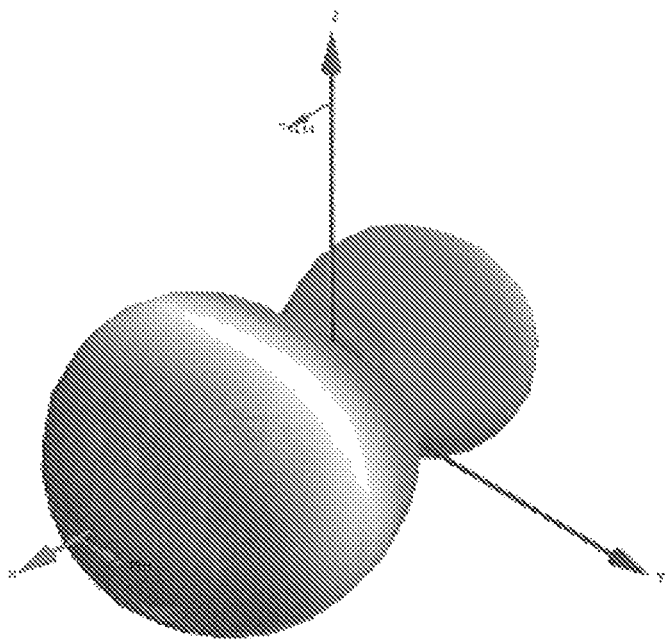
FIG. 9 is an illustration representing radiation directionality of the radio IC device according to the fourth preferred embodiment of the present invention.

In a radio IC device 1D according to a fourth preferred embodiment of the present invention, as illustrated in FIG. 8, the first and second wiring electrodes 21 and 22 preferably have larger land portions, and the radio IC element 50 is mounted to those land portions. Because of the larger land portions of the first and second wiring electrodes 21 and 22, the capacitance C1 is increased in the fourth preferred embodiment. The other structure in the fourth preferred embodiment is the preferably the same or substantially the same as that in the third preferred embodiment of the preferred invention, and advantageous effects of the fourth preferred embodiment are basically as per described in the first and third preferred embodiments. As illustrated in FIG. 9, coaxial or substantially coaxial radiation directionality was obtained with respect to the X-axis. Various design values were the same as those in the third preferred embodiment. A maximum gain was −4.0 dBi at a distal end in the positive direction of the X-axis, and a minimum gain was −8.6 dBi at a zero point of the X-axis. Furthermore, a gain was increased on the negative side of the X-axis. A difference between the maximum value and the minimum value was as small as 4.6 dBi, and good directionality was obtained in each of the three directions (X-, Y- and Z-directions) of the printed circuit board 10. In addition, a reactance value was 169Ω.

Fifth Preferred Embodiment

Figure 10:
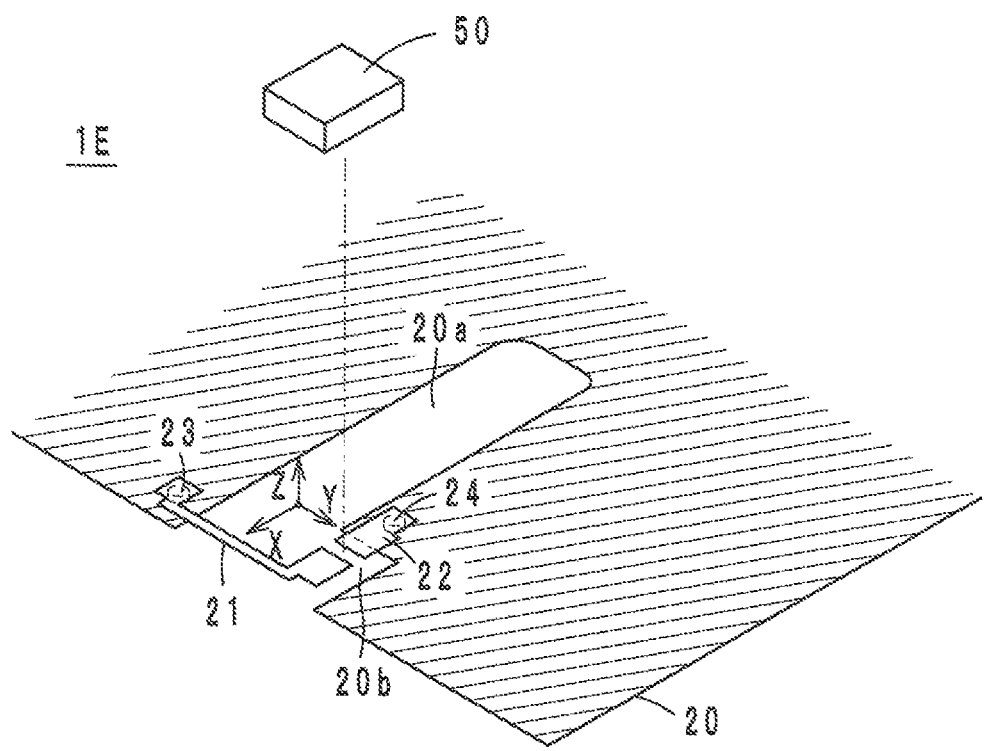
FIG. 10 is a perspective view of a radio IC device according to a fifth preferred embodiment of the present invention.

In a radio IC device 1E according to a fifth preferred embodiment of the present invention, as illustrated in FIG. 10, the cutout 20a is preferably arranged to have an additional cutout portion 20b such that the planar conductor 20 is removed in a portion just under the first wiring electrode 21 and also in a portion just under a portion of the second wiring electrode 22. The remaining structure in the fifth preferred embodiment is preferably the same as or substantially the same as that in the third preferred embodiment of the present invention, and advantageous effects of the fifth preferred embodiment are basically as per described above in the first and third preferred embodiments. As illustrated in FIG. 11, coaxial or substantially coaxial radiation directionality was obtained with respect to the X-axis. Various design values were the same as those in the third preferred embodiment. A maximum gain was −1.8 dBi at a distal end in the positive direction of the X-axis, and a minimum gain was −6.3 dBi at a zero point of the X-axis. Furthermore, a gain was increased on the negative side of the X-axis. A difference between the maximum value and the minimum value was as small as 4.5 dBi, and good directionality was obtained in each of the three directions (X-, Y- and Z-directions) of the printed circuit board 10. In addition, a reactance value was 98Ω.

Sixth Preferred Embodiment

Figure 12:
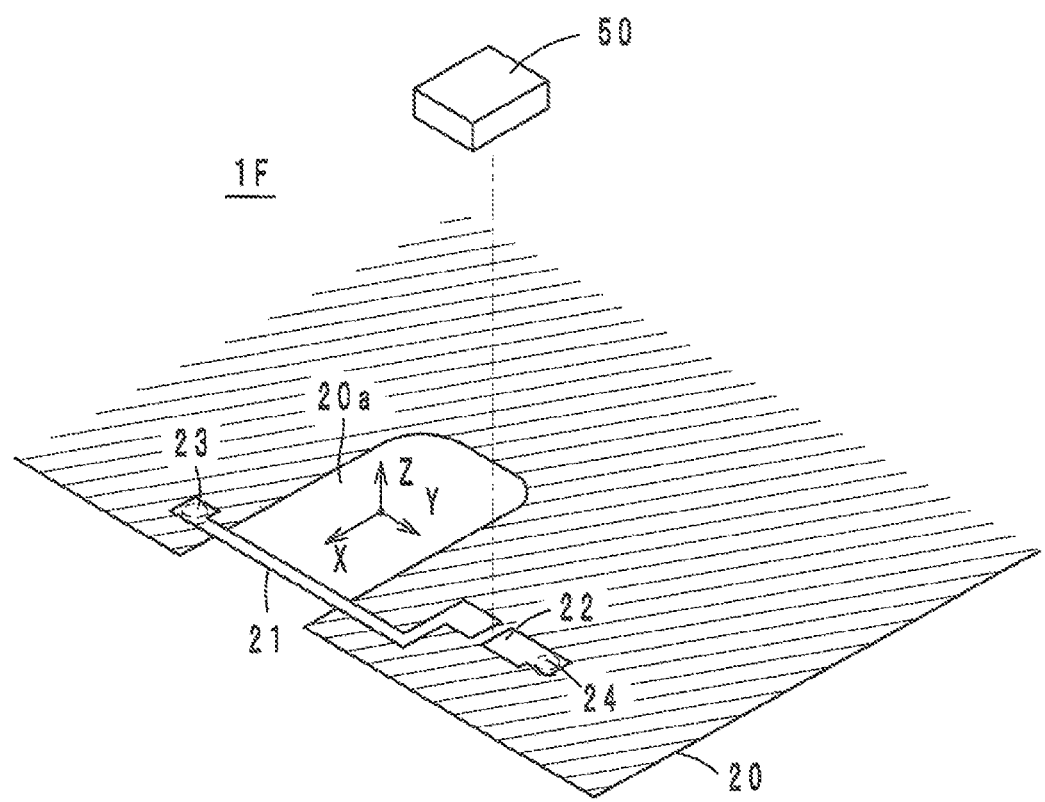
FIG. 12 is a perspective view of a radio IC device according to a sixth preferred embodiment of the present invention.

In a radio IC device 1F according to a sixth preferred embodiment of the present invention, as illustrated in FIG. 12, the land portion of the first wiring electrode 21 is preferably displaced laterally of the cutout 20a (i.e., in the Y-direction), and the second wiring electrode 22 is preferably arranged opposite to the displaced land portion in the lateral direction (Y-direction). Stated in another way, the radio IC element 50 is preferably arranged at a position slightly away from the cutout 20a.

Seventh Preferred Embodiment

Figure 13:
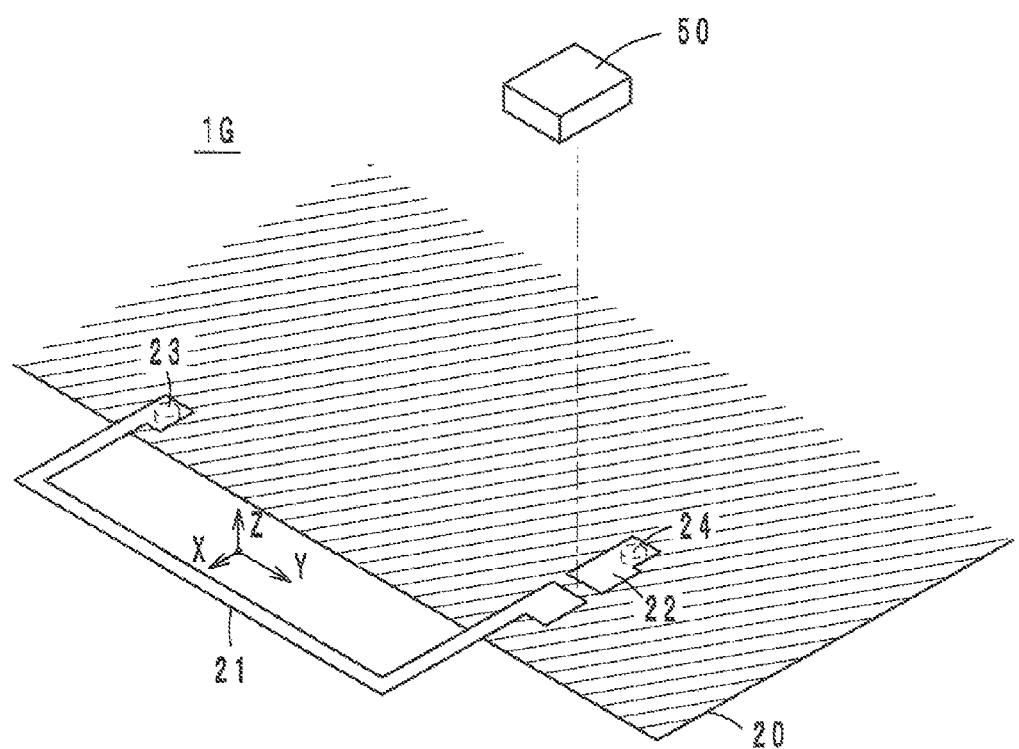
FIG. 13 is a perspective view of a radio IC device according to a seventh preferred embodiment of the present invention.

In a radio IC device 1G according to a seventh preferred embodiment of the present invention, as illustrated in FIG. 13, there is preferably no cutout (such as the cutout 20a of the above-described preferred embodiments of the present invention) provided in the planar conductor 20, and the first wiring electrode 21 is arranged to extend over a portion in which the planar conductor 20 is not provided. According to the seventh preferred embodiment, a current path having a loop shape in each of three X-, Y- and Z-directions is arranged in the same manner as described above with reference to FIG. 2, and advantageous effects basically similar to those in the first preferred embodiment of the present invention can be obtained.

Eighth Preferred Embodiment

As illustrated in FIG. 14, a radio IC device 1H according to an eighth preferred embodiment of the present invention basically has a similar structure to that in the first preferred embodiment of the present invention except for that the first and second wiring electrodes 21 and 22 are preferably arranged to have extended portions with a capacitive element C2 mounted to the extended portions. FIG. 15 illustrates an equivalent circuit of the radio IC device 1H. The capacitive element C2 is connected in series to the radio IC element 50 and is connected in parallel or substantially parallel to the capacitance C1.

The remaining portions of the eighth preferred embodiment of the present invention are preferably the same as that in the first preferred embodiment of the present invention, and advantageous effects of the eighth preferred embodiment are basically similar to those in the first preferred embodiment. In particular, the impedance can be finely adjusted with the addition of the capacitive element C2.

Ninth Preferred Embodiment

Figure 16A:
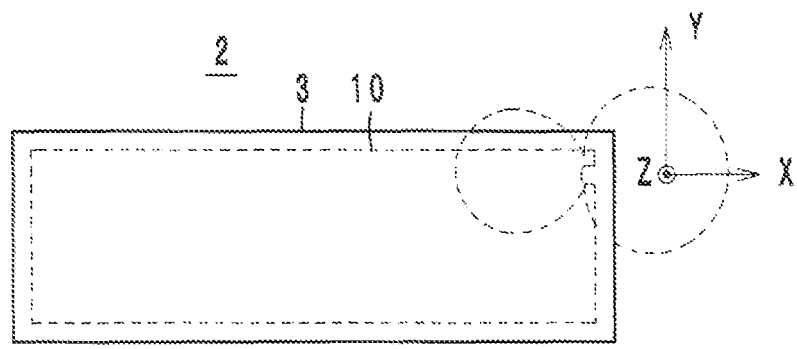
FIGS. 16A and 16B illustrate a basic structure of a radio communication terminal according to a ninth preferred embodiment of the present invention; specifically.
Figure 16B:
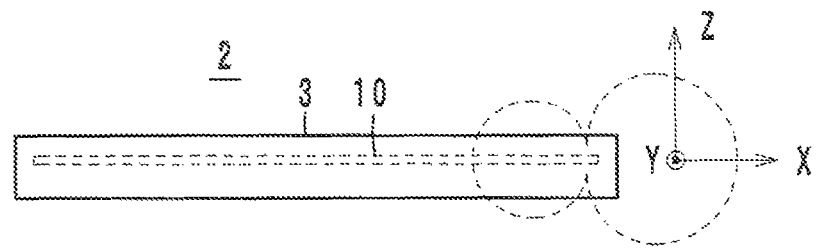

In a radio communication terminal 2 according to a ninth preferred embodiment of the present invention, as illustrated in FIGS. 16A and 16B, one (not specifically illustrated) of the radio IC devices 1A to 1H is mounted to one corner of the printed circuit board 10 that is preferably incorporated in a casing 3 of a cellular phone. The radiation directionality in the X-, Y- and Z-directions of the radio IC device is as per represented by dotted lines in FIG. 16.

Other Preferred Embodiments

The radio IC element 50 may be provided in the form of a radio IC chip 51 arranged to process a high-frequency signal, as illustrated in FIG. 17. Alternatively, the radio IC element 50 may be provided by the radio IC chip 51 and a feeder circuit board 65 including a resonance circuit that has a predetermined resonance frequency, as illustrated in FIG. 18.

The radio IC chip 51, illustrated in FIG. 17, is preferably provided as a silicon semiconductor integrated circuit chip, and it includes a clock circuit, a logic circuit, a memory circuit, etc. Necessary information is stored in the memory circuit. Input/output terminal electrodes 52 and 52 and mounting terminal electrodes 53 and 53 are disposed on a rear surface of the radio IC chip 51. The input/output terminal electrodes 52 and 52 are preferably electrically connected to the land portions of the first and second wiring electrodes 21 and 22 through metallic bumps, for example. The metallic bumps can preferably be made of, e.g., Au or solder.

When the radio IC element 50 is defined by the radio IC chip 51 and the feeder circuit board 65 as illustrated in FIG. 18, various feeder circuits (including a resonance circuit, a matching circuit, etc.) can be selectively disposed on the feeder circuit board 65. As illustrated in the form of an equivalent circuit in FIG. 19, for example, a feeder circuit 66 may include inductance elements L11 and L12, which have different inductance values and which are magnetically coupled with each other (as denoted by a mutual inductance M) in phases reversed to each other. The feeder circuit 66 has a predetermined resonance frequency and serves to establish impedance matching of the impedance of the radio IC chip 51 with respect to the planar conductor 20, etc. It is to be noted that the radio IC chip 51 and the feeder circuit 66 may be electrically (DC) connected, or may be coupled with each other through an electromagnetic field.

The feeder circuit 66 is preferably arranged to forward a high-frequency signal, which is transmitted from the radio IC chip 51 and which has a predetermined frequency, to the planar conductor 20 through the first and second wiring electrodes 21 and 22, and also supplies a high-frequency signal, which is received by the planar conductor 20, to the radio IC chip 51 through the first and second wiring electrodes 21 and 22. Because the feeder circuit 66 has the predetermined resonance frequency, impedance matching with respect to the planar conductor 20 can be more easily established, and a degree of freedom in design of electrical lengths of the first and second wiring electrodes 21 and 22 is increased.

The structure of the feeder circuit board 65 will be described below. As illustrated in FIGS. 17 and 18, the input/output terminal electrodes 52 of the radio IC chip 51 are preferably connected to feeder terminal electrodes 142a and 142b, which are arranged on the feeder circuit board 65, through metallic bumps, for example. Similarly, the mounting terminal electrodes 53 of the radio IC chip 51 are preferably connected to mounting terminal electrodes 143a and 143b through metallic bumps, for example.

As illustrated in FIG. 20, the feeder circuit board 65 is preferably formed by stacking, press-bonding, and firing ceramic sheets 141a to 141h each of which is made of a dielectric material or a magnetic material. Insulating layers defining the feeder circuit board 65 are not limited to the ceramic sheets, and they may be, e.g., resin sheets made of a thermosetting resin or a thermoplastic resin, such as a liquid crystal polymer. The feeder terminal electrodes 142a and 142b, the mounting terminal electrodes 143a and 143b, and via hole conductors 144a, 144b, 145a, and 145b are preferably arranged on and in the sheet 141a that corresponds to an uppermost layer. Wiring electrodes 146a and 146b defining the inductance elements L11 and L12, respectively, are preferably arranged on the sheets 141b to 141h that correspond to the second to eighth layers. Via hole conductors 147a, 147b, 148a, and 148b are also preferably arranged in the sheets 141b to 141h as required to define the inductance elements L11 and L12.

By successively stacking the above-mentioned sheets 141a to 141h, the inductance element L11 is defined by the wiring electrodes 146a that are spirally interconnected through the via hole conductors 147a, and the inductance element L12 is defined by the wiring electrodes 146b that are spirally interconnected through the via hole conductors 147b. In addition, capacitance is generated between the wiring electrodes 146a and 146b.

An end 146a-1 of the wiring electrode 146a on the sheet 141b is connected to the feeder terminal electrode 142a through the via hole conductor 145a, and an end 146a-2 of the wiring electrode 146a on the sheet 141h is connected to the feeder terminal electrode 142b through the via hole conductors 148a and 145b. An end 146b-1 of the wiring electrode 146b on the sheet 141b is connected to the feeder terminal electrode 142b through the via hole conductor 144b, and an end 146b-2 of the wiring electrode 146b on the sheet 141h is connected to the feeder terminal electrode 142a through the via hole conductors 148b and 144a.

In the feeder circuit 66 described above, since the inductance elements L11 and L12 are wound in directions reversed to each other, magnetic fields generated from the inductance elements L11 and L12 are cancelled. Because of the cancellation of the magnetic fields, the wiring electrodes 146a and 146b are required to be prolonged to some extent in order to obtain the desired inductance value. This lowers a Q value and reduces sharpness of a resonance characteristic. As a result, a wider band is obtained near the resonance frequency.

The inductance elements L11 and L12 are arranged at different positions on the left side and the right side, respectively, when seeing through the feeder circuit board 65 from above. Furthermore, the magnetic fields generated from the inductance elements L11 and L12 are reversed in direction. Accordingly, when the feeder circuit 66 is coupled with the first and second wiring electrodes 21 and 22, currents are excited in the first and second wiring electrodes 21 and 22 to flow in reversed directions, thus enabling a current to generate in the planar conductor 20. The planar conductor 20 can be operated as an antenna with a potential difference attributable to the generated current.

By incorporating the resonance/matching circuit in the feeder circuit board 65, characteristic variations caused by an influence of an article on the outside can be suppressed or prevented, and degradation of communication quality can be avoided. Furthermore, by arranging the radio IC chip 51 defining the radio IC element 50 so as to face the center side of the feeder circuit board 65 in a direction of thickness thereof, it is possible to prevent breakage of the radio IC chip 51 and to increase mechanical strength of the radio IC element 50.

As a matter of course, the radio IC device and the radio communication terminal according to the present invention are not limited to the above-described preferred embodiments, and they can be variously modified within the scope of the gist of the present invention.

As described above, preferred embodiments of the present invention can be usefully applied to a radio IC device and a radio communication terminal. In particular, preferred embodiments of the present invention are superior in providing satisfactory radiation characteristics in any of the three directions of the substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radio IC device comprising:
   a radio IC element arranged to process a high-frequency signal;
   a substrate on which the radio IC element is mounted;
   a planar conductor arranged on a first surface of the substrate; and
   a first wiring electrode and a second wiring electrode including respective first ends connected to a pair of input/output electrodes of the radio IC element; wherein
   the first wiring electrode and the second wiring electrode are arranged on a second surface of the substrate, the second surface being parallel or substantially parallel to the first surface, and including respective second ends electrically connected to the planar conductor; and
   the first wiring electrode and the second wiring electrode define loops when looking at the substrate from X-, Y- and Z-directions orthogonal to one another.

2. The radio IC device according to claim 1, wherein a capacitance is provided between one end of the first wiring electrode and the planar conductor.

3. The radio IC device according to claim 2, wherein a capacitive element is connected between the first wiring electrode and the second wiring electrode.

4. The radio IC device according to claim 2, wherein
   the radio IC element includes a radio IC chip arranged to process a high-frequency signal, and a feeder circuit board including a feeder circuit having a predetermined resonance frequency; and
   the feeder circuit board includes two inductance elements.

5. The radio IC device according to claim 1, wherein a portion of the planar electrode opposite to the first wiring electrode is a cut-out portion having a recessed shape.

6. The radio IC device according to claim 5, wherein the cut-out portion with the recessed shape is arranged to have a relatively large width on a side close to an edge of the substrate and a relatively small width on a side which is perpendicular or substantially perpendicular to the side close to an edge of the substrate.

7. The radio IC device according to claim 6, wherein the first wiring electrode has a meandering shape.

8. The radio IC device according to claim 5, wherein the cut-out portion with the recessed shape is arranged to have a relatively small width on a side close to an edge of the substrate and a relatively large width on a side which is perpendicular or substantially perpendicular to the side close to an edge of the substrate.

9. The radio IC device according to claim 8, wherein a land portion of the first wiring electrode is displaced from the cut-out portion in a lateral direction and the second wiring electrode is arranged opposite to the displaced land portion in the lateral direction.

10. The radio IC device according to claim 5, wherein the cut-out portion with a recessed shape includes an additional cut-out portion arranged under the first wiring electrode and the second wiring electrode.

11. The radio IC device according to claim 10, wherein the additional cut-out portion overlaps an entirety of the first wiring electrode and only a portion of the second wiring electrode.

12. The radio IC device according to claim 1, wherein the first wiring electrode has a meandering shape.

13. The radio IC device according to claim 1, wherein a capacitive element is connected between the first wiring electrode and the second wiring electrode.

14. The radio IC device according to claim 1, wherein the radio IC element is arranged outside an entirety of the loop defined when viewed from the X-direction, the loop defined when viewed from the Y-direction, and the loop defined when viewed from the Z-direction.

15. The radio IC device according to claim 1, wherein the radio IC element is a radio IC chip arranged to process a high-frequency signal.

16. The radio IC device according to claim 1, wherein the radio IC element includes a radio IC chip arranged to process a high-frequency signal, and a feeder circuit board including a feeder circuit having a predetermined resonance frequency.

17. The radio IC device according to claim 16, wherein the feeder circuit board includes two inductance elements.

18. The radio IC device according to claim 17, wherein
the two inductance elements are arranged to generate magnetic fields; and
the magnetic fields of respective ones of the two inductance elements are reversed.

19. A radio communication terminal including the radio IC device according to claim 1.

20. The radio IC device according to claim 1, wherein the first wiring electrode is arranged to extend over a portion of the substrate in which the planar conductor is not provided.

* * * * *